E. K. MOORE.
COTTON CHOPPER.
APPLICATION FILED DEC. 11, 1911.
1,039,431.
Patented Sept. 24, 1912.
3 SHEETS—SHEET 2.
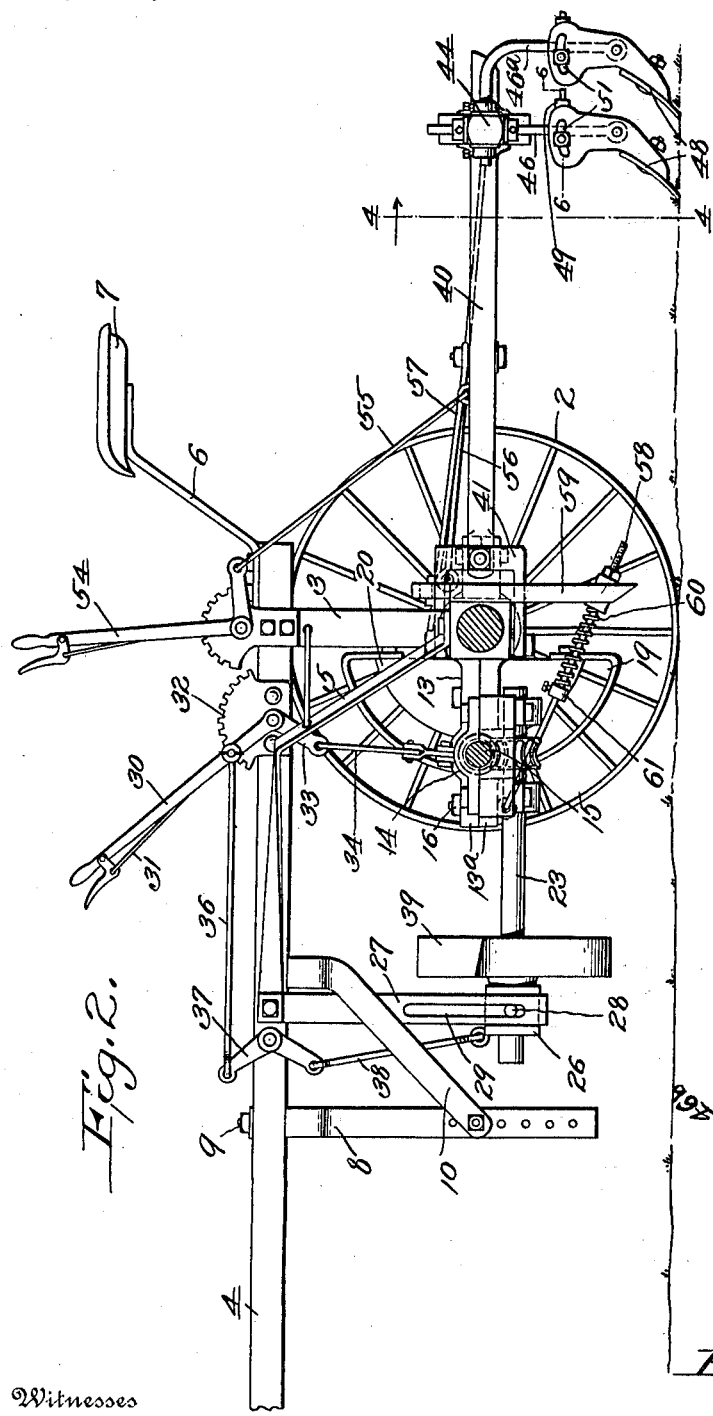
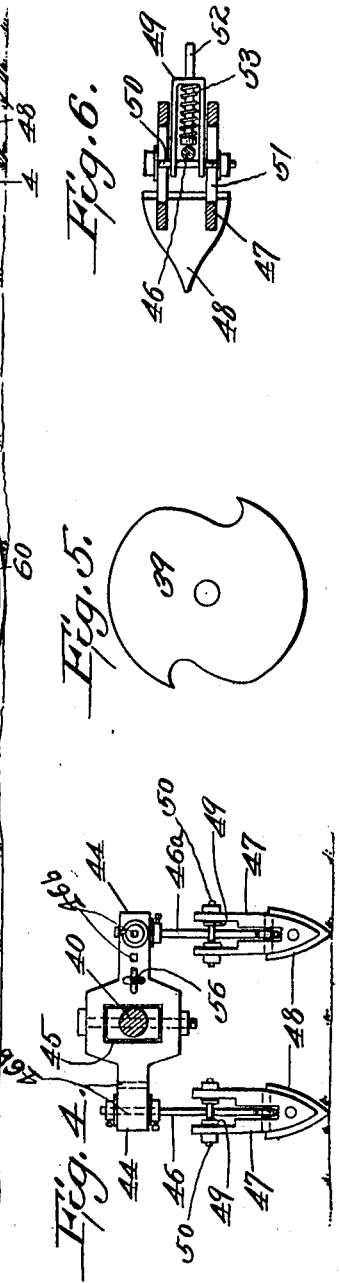
Witnesses
Inventor
E. K. Moore
By H. S. Hice
Attorney E. K. MOORE.
COTTON CHOPPER.
APPLICATION FILED DEC. 11, 1911.
1,039,431.
Patented Sept. 24, 1912.
3 SHEETS—SHEET 3.
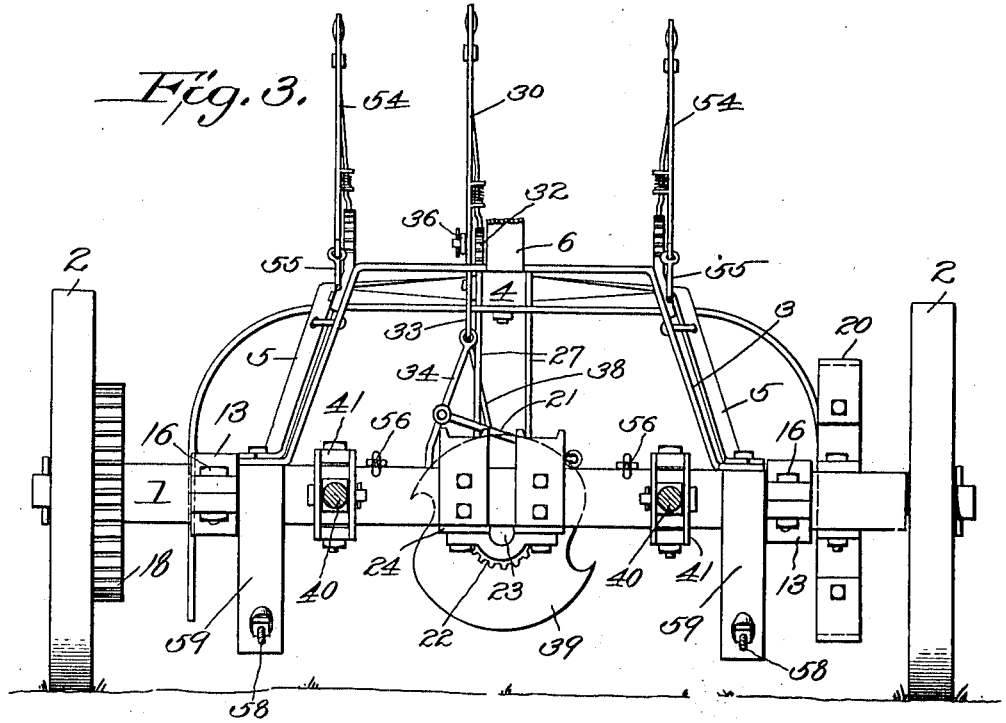
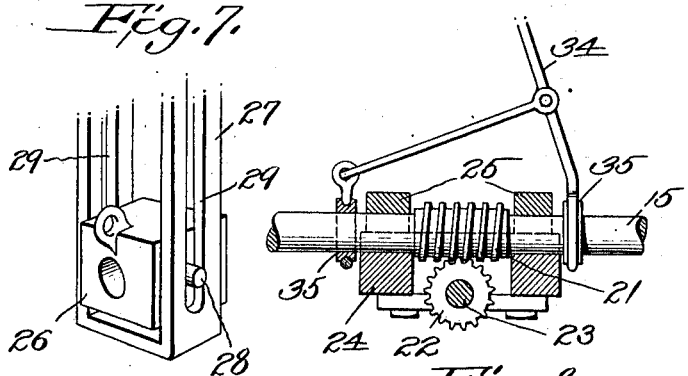
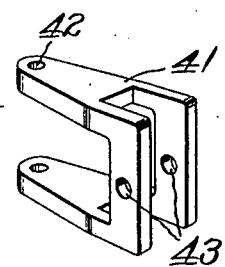
Witnesses
Inventor
E. K. Moore
By N. S. ...
Attorney

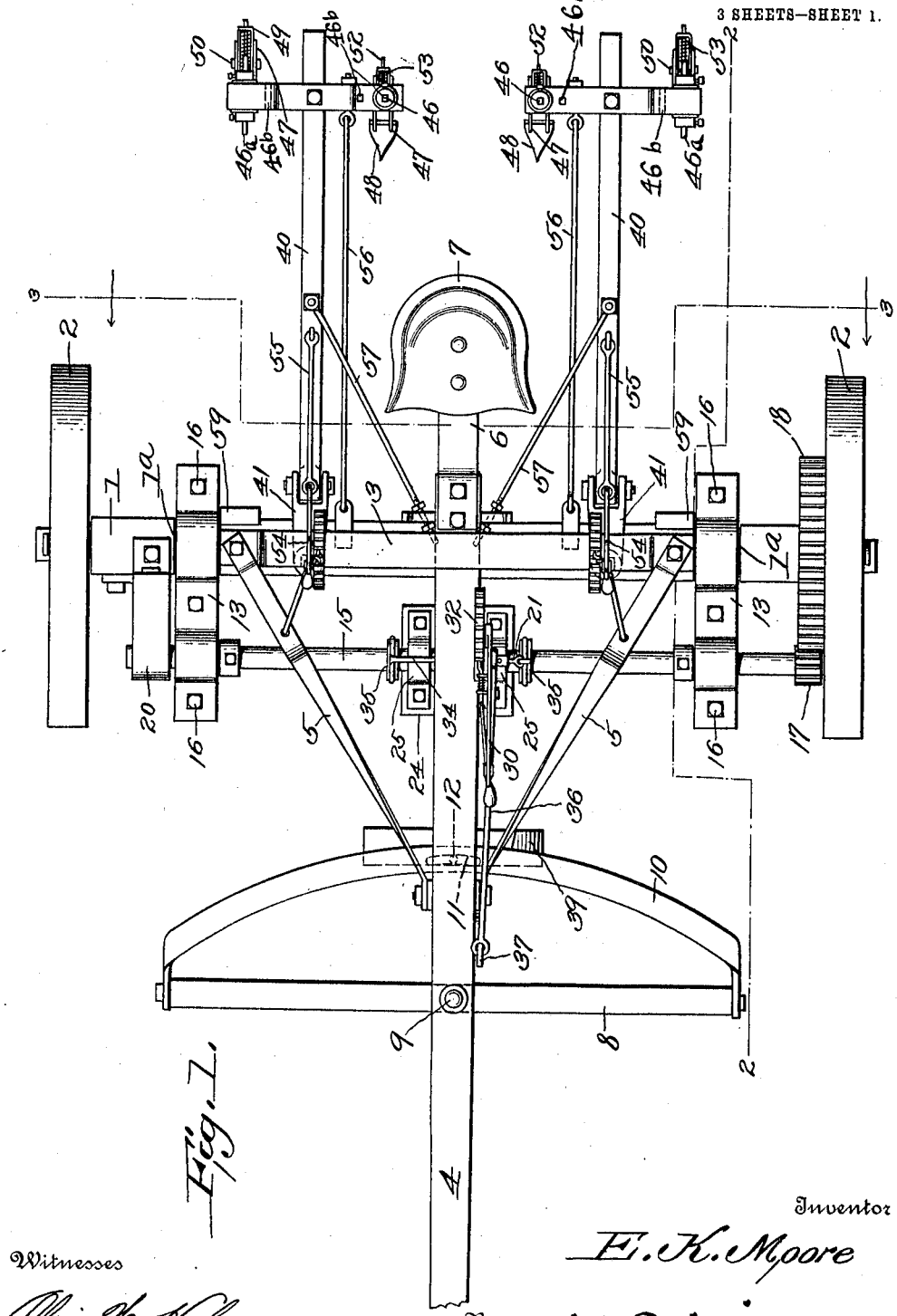

UNITED STATES PATENT OFFICE.

ERNEST K. MOORE, OF HATTIESBURG, MISSISSIPPI.

COTTON-CHOPPER.

1,039,431.   Specification of Letters Patent.   Patented Sept. 24, 1912.

Application filed December 11, 1911. Serial No. 665,045.

*To all whom it may concern:*

Be it known that I, ERNEST K. MOORE, citizen of the United States, residing at Hattiesburg, in the county of Forest and State of Mississippi, have invented certain new and useful Improvements in Cotton-Choppers, of which the following is a specification.

The present invention relates in general to agricultural implements, and more particularly to an improved cotton chopper which embodies novel features of construction whereby it can be readily raised and lowered as desired, and will operate in a positive and effective manner to thin out cotton or similar plants.

The object of the invention is to provide a cotton chopper which is comparatively simple and inexpensive in its construction, which comprises few and durable parts, which is completely under the control of the operator, and which can be readily driven over the fields in the usual manner.

A further object of the invention is to provide a combined cotton chopper and cultivator which will operate in an effective manner to thin out and cultivate cotton at the same time.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a combined cotton chopper and cultivator constructed in accordance with the invention. Fig. 2 is a longitudinal sectional view through the same on the line 2—2 of Fig. 1. Fig. 3 is a transverse sectional view on the line 3—3 of Fig. 1. Fig. 4 is a sectional view through one of the cultivator beams on the line 4—4 of Fig. 2. Fig. 5 is a detail view of the chopper. Fig. 6 is a detail sectional view on the line 6—6 of Fig. 2. Fig. 7 is a detail perspective view of the bearing block at the forward end of the chopper shaft. Fig. 8 is an enlarged sectional view through the gearing for driving the chopper shaft, and Fig. 9 is a detail perspective view of one of the yokes or clevises to which the forward ends of the cultivator beams are pivoted.

Corresponding and like parts are referred to in the following description and indicated in all the views of the drawings by the same reference characters.

Specifically describing the present embodiment of the invention, the numeral 1 designates the axle which is provided at the ends thereof with the usual wheels 2. An arch 3 projects upwardly from the top of the axle and has the rear end of the tongue 4 secured thereto. Brace members 5 extend forwardly from the base of the arch 3 at opposite sides thereof and are secured to the tongue 4 so as to hold the said tongue rigidly in position. A seat spring 6 projects rearwardly from the end of the tongue 4 and has the usual seat 7 mounted thereon. An arch shaped doubletree 8 is pivoted to the tongue 4 at 9, the ends of the said doubletree being extended downwardly and being adapted to have the swingletree applied thereto in the usual manner. A brace 10 is connected to the doubletree, the intermediate portion of the said brace being formed with a curved slot 11 which loosely receives a pin 12 projecting downwardly from the tongue.

A pair of arms 13 project forwardly from the axle 1 and are pivoted upon reduced portions 1$^a$ of the said axle so as to swing freely thereon. The swinging ends of the arms 13 are formed with bearings 14 within which a drive shaft 15 is journaled. The arms 13 may be of any suitable construction although, as indicated upon the drawing, they are preferably composed of complemental members 13$^a$ which are applied to the reduced portions of the axle from opposite sides thereof and connected by fastening members such as the bolts 16, the said complemental sections being formed with corresponding bearing notches adapted to receive the reduced portion of the axle and the drive shaft. One end of the drive shaft is provided with a pinion 17 which meshes with a gear wheel 18 upon the adjacent supporting wheel 2, the drive shaft being thereby revolved as the machine is advanced across a field. The opposite end of the drive shaft is received within a curved guide slot 19 which is formed upon a guide member 20, the said guide member being secured to the axle in such a manner that the slot 19 is concentric with the axis thereof. It will thus be obvious that the arms 13 can be swung upwardly or downwardly about the axle 1 so as to either raise or lower the drive shaft.

An intermediate portion of the drive shaft is formed with a worm 21 which meshes with a gear wheel 22 on a forwardly extending chopper shaft 23. The rear end of the chopper shaft is journaled in a bearing block 24 which is suspended from the drive shaft 15 by means of the hanger straps 25. The forward end of the chopper shaft 23 is journaled in a bearing block 26 which is adjustably mounted upon a hanger 27 pendent from the tongue 4. In the present instance the bearing block 26 is formed with the pivot members 28 which operate loosely within slots 29 formed in opposite sides of the hanger, the said bearing block being thereby adapted to move vertically and also to turn about a horizontal axis. A lever 30 is provided for raising and lowering the chopper, the said lever being provided with the usual latch 31 adapted to engage a segmental rack 32 for the purpose of holding the lever in an adjusted position. The pivot end of the lever is formed with a lateral arm 33 which is connected by a link member 34 to collars 35 upon the drive shaft 15. It will also be observed that the lever 30 is connected by a rod 36 to one arm of a bell crank lever 37 which is pivoted upon the tongue 4, the opposite arm of the bell crank lever being connected by a link 38 to the bearing block 26. It will thus be obvious that by swinging the lever 30 the drive shaft 15 can be swung upwardly or downwardly, and that the bearing block 26 will be simultaneously raised or lowered. The revolving chopper 39 upon the chopper shaft 23 may thus be raised and lowered as is found necessary for the purpose of causing the chopper to act properly upon the cotton.

The swinging end of each of the arms 13 has the forward end of a rearwardly and downwardly extending plunger 58 loosely connected thereto, the opposite end of the plunger sliding freely through a suitable guide opening in an arm 59 projecting from the axle. Coil springs 60 are fitted loosely upon the plungers 58 so as to be interposed between the arms 59 and shoulders 61 upon the plungers. These coil springs normally tend to force the arms 13 upwardly and serve to counteract the weight of the drive shaft 15 and parts carried thereby so that the chopper can be readily raised and lowered through the medium of the lever 30.

Extending rearwardly from the axle 1 is a pair of cultivator beams 40, the forward ends of the beams being connected to the axles by means of yokes 41. The yokes are pivoted to the axle at 42 so as to turn about a vertical axis, while the beams are pivoted to the yokes at 43 so as to turn about a horizontal axis, thereby enabling the beams to be swung in any direction. A cross bar 44 is mounted upon the rear end of each of the beams, the said cross bars having the middle portions thereof enlarged and formed with openings 45 adapted to receive the beams. Projecting downwardly from the inner end of each of the cross bars is a rod 46, and projecting rearwardly from the outer end of each of the said cross bars is a rod 46$^a$ which has the rear end thereof curved downwardly, the lower ends of the rods 46 and 46$^a$ being pivotally connected to standards 47 having cultivator shovels 48 secured thereto. The upper end of the rod 46 may pass through either one of a pair of vertical openings 46$^b$ in the cross bar 44, while the upper end of the rod 46$^a$ may pass through either one of a pair of horizontal openings 46$^b$ in the opposite end of the cross bar 44. When small cultivator shovels are employed, rods 46 and 46$^a$ are brought closely together, while when large cultivator shovels are employed, these rods are adjusted farther apart.

The upper ends of the standards 47 are bifurcated for the reception of spring retaining yokes 49. The arms of the yokes are connected to a pin 50 which operates within slots 51 in the standard. A plunger 52 passes through the end of the yoke and has a coil spring 53 thereon, the spring being compressed when the plunger is forced outwardly. The respective rods 46 and 46$^a$ are received between the plunger and the pin 50 so that the standard is held yieldingly in position. Levers 54 are provided at the top of the arch 3 on opposite sides thereof, the said levers being connected by link members or rods 55 to the respective cultivator beams 40. It will thus be obvious that through the medium of these levers the beams can be raised and lowered as desired. Each of the cross bars 40 is connected by a rod 56 to the axle 1, and each of the cultivator beams is adjustably connected by a diagonal brace member 57 to the axle.

The device is designed to be driven across the field in the usual manner, the rotary chopper 39 acting to thin the cotton, while the shovels 48 cultivate the ground on each side thereof. Either the chopper or the cultivators can be raised and lowered as desired, or swung upwardly into an inoperative position.

Having thus described the invention, what I claim as new and desire to secure by Letters Patent, is:—

1. A cotton chopper including an axle, supporting wheels upon the axle, a guide member carried by said axle, arms pivoted upon the axle and formed with bearings, a drive shaft journaled in the bearings and geared to one of the supporting wheels the drive shaft being engaged by said guide, a bearing block carried by the drive shaft, a chopper shaft journaled upon the bearing block and geared to the drive shaft, and a chopper upon the chopper shaft.

2. A cotton chopper including an axle, supporting wheels upon the axle, arms pivoted upon the axle and formed with bearings, a drive shaft journaled in the bearings and geared to one of the supporting wheels, a bearing block upon the drive shaft, a guide member upon the cotton chopper, a bearing block adjustably mounted upon the guide member, a chopper shaft journaled in the two bearing blocks and geared to the drive shaft, a lever, an operative connection between the lever and both the second bearing block and the drive shaft for raising and lowering the said members.

3. A cotton chopper including an axle, supporting wheels upon the axle, a guide member formed with a curved slot concentric with the axle, an arm pivoted upon the axle and formed with a bearing, a drive shaft journaled in the bearing of the arm, the said drive shaft extending through the curved slot of the guide member and being geared to one of the drive wheels, a bearing block upon the drive shaft, a chopper shaft journaled in the said bearing block, a chopper upon the chopper shaft, and means for swinging the drive shaft and arm about the axle as an axis to raise and lower the same.

4. A cotton chopper including an axle, supporting wheels upon the axle, a drive shaft geared to one of the supporting wheels and mounted to be swung bodily about the axle as an axis, means for moving the drive shaft, yielding means normally tending to raise the drive shaft, a bearing block upon the drive shaft, a chopper shaft journaled upon the bearing block and geared to the drive shaft, and a chopper upon the chopper shaft.

5. A cotton chopper including an axle, supporting wheels upon the axle, an arm pivoted upon the axle and formed with a bearing, a drive shaft journaled in the bearing and geared to one of the supporting wheels, a spring actuated plunger normally tending to swing the arm upwardly, means for swinging the drive shaft and arm about the axle to raise and lower the drive shaft, a bearing block upon the drive shaft, a chopper shaft journaled upon the bearing block and geared to the drive shaft, and a chopper upon the chopper shaft.

6. A cotton chopper including an axle, supporting wheels upon the axle, a guide member applied to the axle and provided with a curved slot concentric with the axis of the axle, arms pivoted upon the axle and formed with bearings, a drive shaft journaled in the bearings and extending through the before mentioned slot of the guide member, the said drive shaft being geared to one of the supporting wheels, spring actuated plungers operating upon the arms and normally tending to swing the same upwardly, means for swinging the drive shaft and arms about the axle to raise and lower the drive shaft, a bearing block upon the drive shaft, a second bearing block adjustably mounted upon the cotton chopper, a chopper shaft journaled upon the two bearing blocks and geared to the drive shaft, and a chopper upon the chopper shaft.

7. A cotton chopper including an axle, supporting wheels upon the axle, a frame upon the axle, arms pivoted upon the axle and formed with bearings, a drive shaft journaled in the bearings and geared to one of the drive wheels, the before mentioned arms being adapted to be swung upwardly and downwardly to raise and lower the drive shaft, a guide member upon the frame, a bearing block slidably mounted upon the guide member, a second bearing block upon the drive shaft, a chopper shaft journaled in the two bearing blocks and geared to the drive shaft, a chopper upon the chopper shaft, a lever, and an operative connection between the lever and both the drive shaft and the first mentioned bearing block for raising and lowering the same.

In testimony whereof I affix my signature in presence of two witnesses.

ERNEST K. MOORE.

Witnesses:
M. M. MOORE,
W. M. EDMONSON.

---

Copies of this patent may be obtained for five cents each, by addressing the "Commissioner of Patents, Washington, D. C."